April 25, 1967    H. WAGNER    3,315,746
STRIP-SHAPED OR RAIL-SHAPED INSERT
ELEMENT FOR INDICATOR BOARDS
Filed May 12, 1965    2 Sheets-Sheet 1
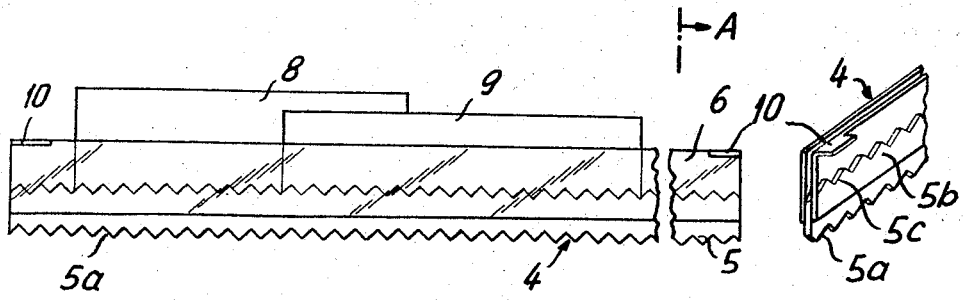
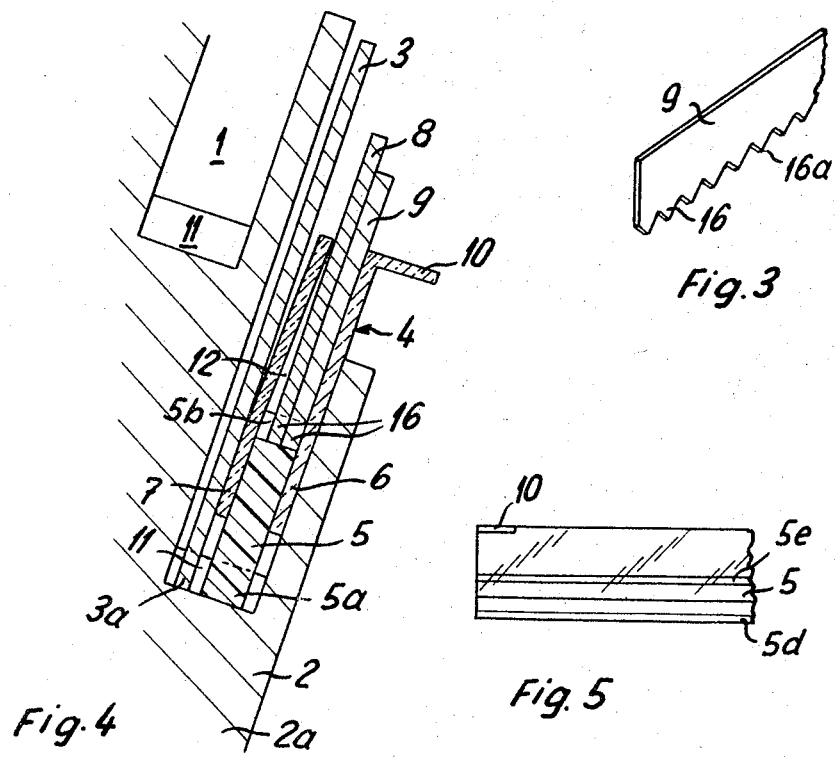
INVENTOR.
HEINZ WAGNER
BY Werner W. Kleeman
Attorney April 25, 1967 H. WAGNER 3,315,746
STRIP-SHAPED OR RAIL-SHAPED INSERT
ELEMENT FOR INDICATOR BOARDS
Filed May 12, 1965 2 Sheets-Sheet 2
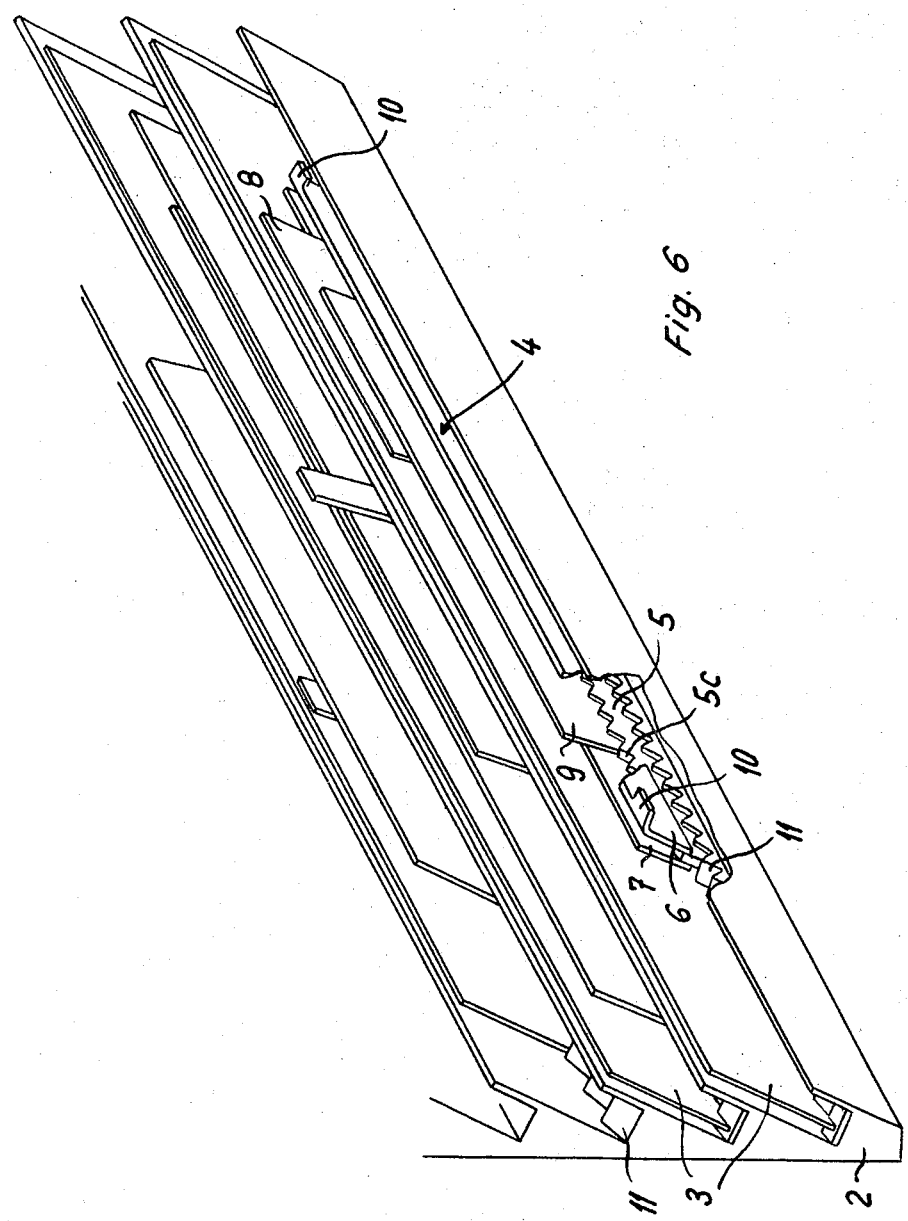
INVENTOR.
HEINZ WAGNER 3,315,746
STRIP-SHAPED OR RAIL-SHAPED INSERT
ELEMENT FOR INDICATOR BOARDS
Heinz Wagner, Zurich, Switzerland, assignor to Rüegg-Naegeli & Cie. Aktiengesellschaft, Zurich, Switzerland, a corporation of Switzerland
Filed May 12, 1965, Ser. No. 455,166
Claims priority, application Switzerland, May 20, 1964, 6,545/64
8 Claims. (Cl. 116—135)

The present invention broadly relates to indicator boards and, more specifically, pertains to a new and improved insert element for indicator boards.

Indicator boards are already known to the art which are capable of receiving laterally displaceable strip-shaped indicating elements in guides which are stationarily arranged approximately parallel to the surface of the indicator board. Such indicator boards are used for instance for controlling dates, work or load schedules, or for quantity control.

However, such type indicator boards possess different disadvantages. For example, upon changing a control date collective displacement of the entire plan in its guide is not possible. Also, common re-positioning of all indicator elements of a plan to another sector of the board cannot be carried out, rather, all of the indicator elements must be individually displaced. Furthermore, the plan cannot be composed at the place of work, it must be set-up at the board itself. Should the plan serve as a working document for a conference then the entire indicator board must be brought along, or else the data must be copied.

Also known to the art are indicator boards which possess guide rails for receiving strip-shaped indicator elements wherein the guide rails are mounted independently of one another and are detachable from the base plate by laterally pulling them out as well as by raising them. Although indicator boards of the last-mentioned type permit all indicator elements of a plan to be collectively re-oriented at a different sector of the board and also enable composing the plan at the work situs as well as using an individual plan as a working document at a conference for instance, nonetheless such indicator boards do not permit common displacement of the plan when confronted with a change in control date.

Accordingly, it is a primary object of the present invention to provide an improved indicator board which overcomes the above-mentioned disadvantage of prior art constructions.

A more specific object of this invention is to provide an improved indicator board wherein the individual indicator elements of a plan can be re-positioned relative to one another and the entire plan is capable of transposition as a unit.

Another important object of this invention is to provide an insert element for indicator boards of the type mentioned so that it is possible to program a plan at a location other than at the indicator board itself, and permits shifting of the indicator elements forming the plan relative to one another or as a unit.

These objects as well as others which will become more apparent as the description proceeds can be fulfilled by the teachings of the present invention which contemplates providing an insert element or elements for the indicator board. The insert element of the invention is characterized by the provision of a guide capable of displaceably receiving one or more indicator elements. Moreover, this insert element is constructed such that it can be inserted in the same manner as further indicator elements and together with such in the guideways of the indicator board and is laterally displaceable together with such further indicator elements in these indicator board guideways.

According to an important feature of the invention the guide of the insert element for receiving indicator elements is advantageously formed by two side portions or elements connected to a base portion of the insert element. In effect, the base portion and side portions cooperate to form the insert element proper. The base portion is preferably formed at its lower and/or upper marginal surfaces in such a manner that an undesired lateral displacement of the insert element in the associated guideway of the indicator board as well as an undesired displacement of the indicator elements in the guide of the insert element is prevented. More specifically, it is possible to provide the base portion at its lower and/or upper edge with a respective strip member possessing roughened surface properties, for instance, with a strip of glass paper. On the other hand, the base portion could also be provided at its lower and/or upper edges with locking or retaining means serving to engage in complementary retaining means at the guideway of the indicator board and at the indicator elements respectively. One possible construction for these retaining means contemplates configuring such as toothed borders or ledges incorporating a continuous series of teeth without intermediate gaps which render it possible to displace the components which are to be shifted through pressure or tension in the displacement direction. Moreover, the base portion can be provided at its lower and upper surfaces with the same parallel superimposed arrangement of teeth.

Concerning the side portions such can be constructed so that they exert a clamping action upon indicator elements placed therebetween, for instance they can possess a certain resilience. Finally, the insert elements can also be provided with two handgrips extending out of the plane of the body of the insert element and advantageously constructed as flap members.

Other features, objects and advantages of the invention will become apparent by reference to the following detailed description and drawing in which:

FIGURE 1 is a front view of an insert element designed according to the teachings of the present invention with two indicator elements inserted therein;

FIGURE 2 is a fragmentary view of the insert element depicted in FIGURE 1, as viewed along the line A—A thereof;

FIGURE 3 is a fragmentary view of an indicator element received in the insert element of FIGURE 1;

FIGURE 4 is an enlarged, fragmentary cross-sectional view through a portion of an indicator board provided with the insert element depicted in FIGURE 1 inserted into a guideway of this indicator board;

FIGURE 5 is a fragmentary view of a variant construction of the base portion of the insert element; and FIGURE 6 is a perspective fragmentary view of the indicator board, partly cut away, to reveal the arrangement of the insert element of FIGURE 1 therein and the cooperative relationship of the retaining means provided at the insert element and the guideway of the indicator board.

Describing now the drawing, it will be seen that there is depicted an indicator board 2 defined by a base member 2*a* provided with a number of guides or guideways 1 formed in the body of and approximately parallel to the plane of the base member 2*a*. As best seen by referring to FIGURES 2 and 4 a strip- or rail-shaped insert element 4 is inserted in a guideway 1 of the indicator board 2 and in front of a first indicator element or member 3. Indicator member 3 is provided at its lower edge with retaining means, in the present instance teeth means 3*a* engageable with a toothed border or ledge 11 having complementary teeth and provided at the floor of the guideway 1. The insert elongated element 4 comprises a base portion 5 and two side portions 6 and 7 connected to opposite faces of the aforesaid base portion 5. It will be recognized that side portions 6 and 7 are spaced from one another to provide a guide 12 therebetween for receiving one or more indicator elements therein, such as elements 8 and 9. Side portions 6 and 7 can be typically formed of a transparent material, such as a suitable plastic, and are somewhat resilient so that they exert a clamping action upon the inserted indicator elements 8, 9.

In the exemplary embodiment the base portion 5 is shown provided at its lower and upper surfaces with a toothed border 5a and 5b respectively. The indicator elements 8, 9 are also provided at their lower edge with a toothed border 16 including complementary teeth 16a capable of engaging with the teeth 5c of the toothed border 5b. The respective toothed borders 5a and 5b prevent unintentional displacement of the insert element 4 in the guideway 1 of the indicator board 2 likewise provided with the appropriately configured toothed border 11 and unintentional displacement of the indicator elements 8 and 9 in the guide 12 of the insert element 4. The inclination of the flanks of the teeth of the aforementioned toothed ledges or borders 5a, 5b, 11 and 16 is selected such that in the presence of tension or pressure in the longitudinal direction of the strip-shaped components 3, 4, 8 or 9, the corresponding teeth thereof slide out of the associated teeth of the cooperating toothed border. In this manner, there is rendered possible very easy and simple re-positioning or displacement. Although in the considered embodiment the locking or retaining means are assumed to be toothed ledges 5a, 5b, 11, 16 the invention is by no means limited to such physical structure. Thus, for instance, in FIGURE 5 the retaining means are formed by a respective strip 5d and 5e applied to the lower and upper marginal edges of the base portion 5 of the insert element, such strips 5d, 5e advantageously possessing a rough surface quality, for instance are formed of glass paper. Naturally, when using such type retaining means a corresponding construction can be provided for the indicator elements 3, 8, 9 and the guideway 1. It should thus be quite apparent that while a toothed construction provides a very effective form of retaining means other types of retaining means could also be used.

By referring to FIGURE 1 it will be seen that the side portion 6 of the insert element 4 is provided with two flap-shaped handgrips 10, one at each end of this insert element 4. These flaps 10 facilitate insertion and removal of the insert element 4 into and out of the relevant guideways of the indicator board 2.

The described arrangement of indicator elements 8, 9 secured in a substantially strip-shaped or rail-shaped insert element 4 renders it possible to displace such indicator elements 8, 9 individually along the base portion 5 or collectively with such base portion 5 in the associated guideway 1 of the indicator board 2. It is further now also possible to remove the entire plan 4, 8, 9 from the guideway 1 and to place such at another location of the indicator board 2.

A further advantage of the illustrated embodiment resides in the possibility of assembling the entire plan, for instance in a time-study office, at a work table or at a working implement provided for this purpose which is equipped with a scale corresponding to the scale of the indicator board. The thus assembled plan can thereafter be inserted as a unit in the indicator board 2. When attending a conference it is sufficient to merely take along the insert element 4 with the indicator element or elements, possibly together with the working implement, and it is not necessary to transport the entire indicator board, thereby rendering the entire procedure simpler and less cumbersome. Moreover, when working with operating plans, order date controls or otherwise, it is a further advantage of the present invention that the insert element per machine or order can be displaced as a unit while further strip-shaped indicator elements 3 can remain in place. Finally, it is mentioned that the term "substantially U-shaped insert element" as employed herein is used in its broader sense, and is not limited to such specific configuration, as V-shaped insert elements for instance, are also contemplated.

While there is shown and described present preferred embodiment of the invention it is to be distinctly understood that the invention is not limited thereto but may be otherwise variously embodied and practiced within the scope of the following claims.

What is claimed is:

1. In combination, an indicator board provided with means defining at least one guideway extending lengthwise of the surface of the indicator board, at least one laterally displaceable indicator member received in said guideway, an elongated substantially U-shaped insert element inserted in said guideway along with yet independently of said laterally displaceable indicator member, said insert element incorporating means defining a guide for displaceably receiving at least one indicator element, at least one indicator element displaceably carried in said guide of said insert element, said insert element and said indicator element received therein being freely laterally displaceable relative to one another and collectively displaceable in said guideway of said indicator board both conjointly with or relative to said indicator member.

2. The combination set forth in claim 1 wherein said insert element comprises a base portion and a pair of side portions carried by said base portion, said base portion and said pair of side portions forming said guide for the receipt of said indicator element therein.

3. In combination, an indicator board provided with means defining at least one guideway extending lengthwise of the surface of the indicator board, at least one laterally displaceable indicator member received in said guideway, an elongated, substantially U-shaped insert element inserted in said guideway along with said laterally displaceable indicator member, said elongated U-shaped insert element incorporating means defining a guide for displaceably receiving at least one indicator element, at least one indicator element located in said guide, said guide-defining means including a base portion and a pair of side portions carried by said base portion, said base portion having a lower and an upper surface, said guideway having retaining means cooperating with said lower surface for preventing undesired lateral shifting of said insert element, said lower and upper surfaces being provided with unintentional displacement, prevention means, said unintentional displacement preventing means of said lower surface reacting with said retaining means of said guideway to prevent undesired lateral shifting of said elongated U-shaped insert element in said guideway of said indicator board, whereas said unintentional displacement preventing means of said upper surface coact with said indicator element to prevent undesired lateral shifting of said indicator element in said guide of said elongated U-shaped insert element, said elongated U-shaped insert element being laterally displaceable in said guideway of said indicator board.

4. The combination set forth in claim 3, wherein said indicator element is provided with retaining means coacting with said upper surface of said elongated U-shaped insert element, said unintentional displacement preventing means of said lower and upper surfaces being complementary to said retaining means of said guideway and said indicator element in said guide, respectively, and are engageable therewith, said laterally displaceable indicator member being provided with complementary retaining means which engage with said retaining means of said guideway.

5. The combination set forth in claim 3, wherein said indicator element is provided with retaining means co-acting with said upper surface of said elongated U-shaped insert element, said unintentional displacement preventing means of said lower and upper surfaces being complementary to said retaining means of said guideway and said indicator element in said guide, respectively, and are engageable therewith, said laterally displaceable indicator member being provided with complementary retaining means which engage with said retaining means of said guideway, each of said retaining means and said unintentional displacement means being constructed as a respective toothed border embodying a continuous series of successive teeth devoid of tooth gaps therebetween, said teeth being configured to permit selective displacement of said insert element relative to said guideway and said indicator element relative to said insert element when subjected to either pulling or pressure in the displacement direction thereof.

6. A movable substantially U-shaped insert element for use in a guideway of an indicator board, said substantially U-shaped insert element comprising an elongated base portion, a pair of elongated side portions carried by said base portion, said base portion and pair of side portions cooperating with one another to define a guide for receipt therein of at least one indicator element, said base portion including a lower surface provided with retaining means capable of co-acting with the indicator board to prevent undesired shifting of said insert element relative to said indicator board.

7. A substantially strip-shaped insert element as defined in claim 6 wherein at least one of said side portions is formed of resilient material to provide a clamping action upon said indicator element when inserted in said guide.

8. A movable substantially U-shaped insert element for an indicator board comprising an elongated base portion, a pair of elongated side portions carried by said base portion, said base portion and pair of side portions cooperating with one another to define a guide for receipt therein of at least one indicator element, said base portion including an upper surface provided with retaining means capable of co-acting with said indicator element to prevent undesired shifting thereof in said guide.

References Cited by the Examiner

UNITED STATES PATENTS

| 108,887 | 11/1870 | Curtis | 40—124 |
| 700,465 | 5/1902 | Willy | 116—135 |
| 1,859,750 | 5/1932 | Pratt | 116—135 |
| 2,622,346 | 12/1952 | Guichard | 116—135 |
| 2,630,096 | 3/1953 | Conley | 116—135 |
| 2,704,048 | 3/1955 | Perier | 116—135 |
| 2,713,738 | 7/1955 | Harman | 40—64 |
| 2,722,070 | 11/1955 | Thompson | 40—17 |
| 2,745,201 | 5/1956 | Giuseppe et al. | 40—140 |
| 2,787,850 | 4/1957 | Ware | 116—135 |
| 2,795,205 | 6/1957 | Wells | 116—135 |
| 2,967,366 | 1/1961 | Colbert | 40—17 |
| 3,168,787 | 2/1965 | Surrey | 40—65 |

FOREIGN PATENTS

| 730,442 | 5/1955 | Great Britain. |
| 877,073 | 9/1961 | Great Britain. |
| 148,348 | 1/1955 | Sweden. |

LOUIS J. CAPOZI, *Primary Examiner.*